United States Patent

Murakami et al.

[11] Patent Number: 5,477,528
[45] Date of Patent: Dec. 19, 1995

[54] MAGNETO-OPTICAL DISK AND THE REPRODUCING METHOD THEREOF

[75] Inventors: Yoshiteru Murakami, Nishinomiya; Junsaku Nakajima, Yamatotakada; Akira Takahashi, Nara; Junichiro Nakayama, Shiki; Kenji Ohta, Kitakatsuragi, all of Japan

[73] Assignee: Sharp Kabushiki Kaisha, Osaka, Japan

[21] Appl. No.: 346,586

[22] Filed: Nov. 16, 1994

Related U.S. Application Data

[63] Continuation of Ser. No. 977,131, Nov. 16, 1992, abandoned.

[30] Foreign Application Priority Data

Nov. 25, 1991 [JP] Japan .................... 3-309034

[51] Int. Cl.$^6$ .................................... G11B 7/00
[52] U.S. Cl. .................... 369/275.4; 369/275.1; 369/275.3; 369/272; 360/135
[58] Field of Search .................... 360/135, 131, 360/133, 59; 369/275.2, 275.3, 275.1, 13, 272

[56] References Cited

U.S. PATENT DOCUMENTS

| 5,168,482 | 12/1992 | Aratani et al. | 369/13 |
| 5,175,714 | 12/1992 | Kikitsu et al. | 360/59 |
| 5,233,578 | 8/1993 | Yamamoto et al. | 369/13 |

FOREIGN PATENT DOCUMENTS

| 2036958 | 9/1991 | Canada . | |
| 0256827 | 2/1988 | European Pat. Off. . | |
| 0415449 | 3/1991 | European Pat. Off. . | |
| 0475558 | 3/1991 | European Pat. Off. . | |
| 475558 | 3/1992 | European Pat. Off. . | |

OTHER PUBLICATIONS

Super Resolution in Magneto–Optical Disks, (Technical Research Reports of Japan Applied Magnetics Institute, vol. 15, No. 5, 1991).

*Primary Examiner*—Viet Q. Nguyen
*Attorney, Agent, or Firm*—David G. Conlin; George W. Neuner; Brian L. Michaelis

[57] ABSTRACT

A magneto-optical disk, which possesses a disc-shaped substrate and a recording layer composed of a perpendicular magnetization film that is formed on the substrate, characterized in having: an area wherein magnetic domains having an upward magnetization and magnetic domains having a downward magnetization are alternately aligned along at least one circuit of the disk, the area being formed on the recording layer, the length of the magnetic domains having the upward magnetization being virtually equal to the length of the magnetic domains having the downward magnetization. This invention also has a reproducing method which is characterized in that, when information is reproduced by projecting a light beam onto the magneto-optical recording disk, the intensity of the light beam is adjusted so as to maximize the amplitude of a reproduced signal that is obtained from the area. With the above arrangement, a high-quality reproduced signal can be obtained independent of the characteristics of individual magneto-optical disks.

10 Claims, 4 Drawing Sheets

MAGNETO-OPTICAL DISK AND THE REPRODUCING METHOD THEREOF

This is a continuation of application Ser. No. 07/977,131 filed on Nov. 16, 1992 now abandoned.

FIELD OF THE INVENTION

The present invention relates to a magneto-optical recording disk, and also concerns a reproducing method for reproducing bit information that is recorded in a domain smaller than the diameter of a light beam by using this magneto-optical recording disk.

BACKGROUND OF THE INVENTION

The recording density of an optical storage device is dependent on the size of a light spot on the recording medium, which is formed by a light beam used for recording and reproducing. Recently, a reproducing method has been proposed, wherein it is possible to reproduce information recorded in domains whose size is smaller than the size of a light beam spot.

Normally, the light beam for use in optical recording is converged to a diffraction limit by a converging lens; therefore, the light intensity distribution shows a Gaussian distribution, and thus the temperature distribution on the recording medium also exhibits a virtual Gaussian distribution. As a result, an area having a temperature that is not less than a predetermined temperature becomes smaller in size than the size of the light beam spot. Consequently, the recording density can be greatly improved if only the spot having a temperature not less than the predetermined temperature is utilized for reproduction.

Referring to FIG. 5, the following description will discuss a magneto-optical disk wherein information recorded in domains whose size is smaller than the size of a light beam spot can be reproduced.

The magneto-optical disk is constituted of a substrate 21 as well as a readout layer 22 and a recording layer 23 formed on the substrate 21. The recording layer 23 has a great coercive force at room temperature. On the contrary, the readout layer 22 has a small coercive force at room temperature. When the temperature of an area of the readout layer 22 to be reproduced is raised, the direction of the magnetization thereon becomes coincident with the direction of the magnetization of the recording layer 23 due to the effect of the recording layer 23. That is, the magnetization of the recording layer 23 is copied onto the readout layer 22 by an exchange coupling force that is exerted between the readout layer 22 and the recording layer 23.

In the above arrangement, recording is executed by the ordinary photo-thermomagnetic recording method. When the recorded bits are to be reproduced, it is necessary to initialize the direction of magnetization of the readout layer 22 so as to make it coincident with the predetermined direction (upward in FIG. 5) by applying an auxiliary magnetic field from an auxiliary magnetic field generating device 24. Then, by projecting a reproduction-use light beam thereonto, the temperature of the recording layer 23 is locally raised and the magnetized information on the recording layer 23 is copied onto the readout layer 22. Thus, the temperature of a central portion of the area which has received the reproduction-use light beam is raised, and only the information located in the central portion is reproduced. Accordingly, recorded bits whose size is smaller than the size of the light beam spot are permitted to be read out.

However, in the above-mentioned conventional configuration, in the case of using a reproduction-use light beam with high intensity, a problem is presented in that, since the temperature of the adjoining recorded bits is also raised, the amplitude of a reproduced signal becomes smaller. On the contrary, in the case of using a reproduction-use light beam with low intensity, a problem is presented in that, since the temperature of a recorded bit is not raised, a reproduction signal can not be obtained.

SUMMARY OF THE INVENTION

It is the first object of the present invention to provide a magneto-optical disk wherein a recorded bit whose size is smaller than a light beam spot can be well reproduced. It is the second object of the present invention to provide a method for obtaining a good reproduced signal by the use of this magneto-optical disk.

In order to achieve the first object, the magneto-optical disk of the present invention, which possesses a disc-shaped substrate and a recording layer composed of a perpendicular magnetization film that is formed on the substrate, is characterized in having: an area wherein magnetic domains having an upward magnetization and magnetic domains having a downward magnetization are alternately aligned along at least one circuit of the disk, the area being formed on the recording layer, the length of the magnetic domains having the upward magnetization being virtually equal to the length of the magnetic domains having the downward magnetization.

In order to achieve the second object, the reproducing method of the present invention is characterized in that, when information is reproduced by projecting a light beam onto the magneto-optical recording disk, the intensity of the light beam is adjusted so as to maximize the amplitude of a reproduced signal that is obtained from the area.

With the above arrangement, by reproducing pre-recorded information on the magneto-optical disk, the intensity of the light beam is adjusted so as to maximize the amplitude of the reproduced signal; therefore, a high-quality reproduced signal can be obtained independent of the characteristics of individual magneto-optical disks.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic side view illustrating a magneto-optical disk of the present invention.

FIG. 2 is a graph showing the relationship between the magnetic state of $Gd_x(FeCo)_{1-x}$ used for the readout layer of FIG. 1 and the content of Gd, which is associated with temperatures.

FIG. 3 is an explanatory drawing indicating a principle of reproducing the magneto-optical disk of FIG. 1.

FIG. 4 is an explanatory drawing showing the case where the adjoining recorded bits are reproduced when a light beam having too strong an intensity is applied in reproducing the magneto-optical disk of FIG. 1.

DESCRIPTION OF THE EMBODIMENTS

Referring to FIGS. 1 through 4, the following description will discuss one embodiment of the present invention.

Figure 1:
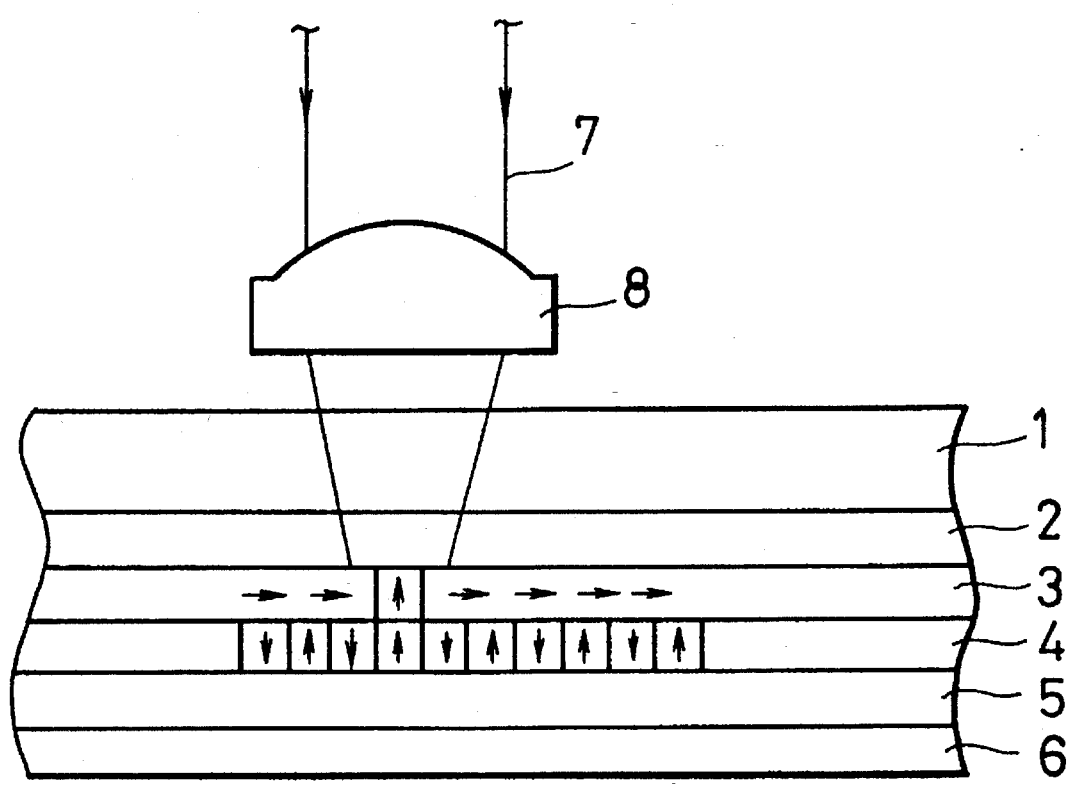
FIGS. 1 through 4 show one embodiment of the present invention.

As shown in FIG. 1, a magneto-optical disk of the present invention is constituted of a substrate 1, a transparent dielectric film 2, a readout layer 3, a recording layer 4, a transparent dielectric film 5 and an overcoat film 6 that are laminated in this order.

The substrate 1 is made of a transparent material, for example, polycarbonate of 86 mm in diameter, 15 mm in inside diameter and 1.2 mm in thickness. A groove in the shape of spiral (not shown) is formed on the surface of the substrate 1 on the dielectric film 2 side so as to guide a light beam 7. The groove is formed, for example, within a range from 19 mm to 41 mm in the radius of the substrate 1, and formed simultaneously as the substrate 1 is manufactured through injection molding. The pitches of the groove range from 1–1.6 μm.

The transparent dielectric film 2 is made of a film of AlN, SiN or AlSiN. Its film thickness is set to be on the order of $\lambda/(4n)$. Here, $\lambda$ is the wavelength of the light beam 7 and n is the refractive index of the transparent dielectric film 2. Therefore, when the wavelength of the light beam 7 is 800 nm, the film thickness of the transparent dielectric film 2 is on the order of 80 nm.

The readout layer 3 is made of a thin film of a rare-earth-transition-metal alloy, wherein the easy axis of magnetization is within the plane at room temperature and the easy axis of magnetization becomes perpendicular to the plane when the light beam 7 is projected thereonto during reproduction and a temperature rise occurs at the irradiated area.

Figure 2:
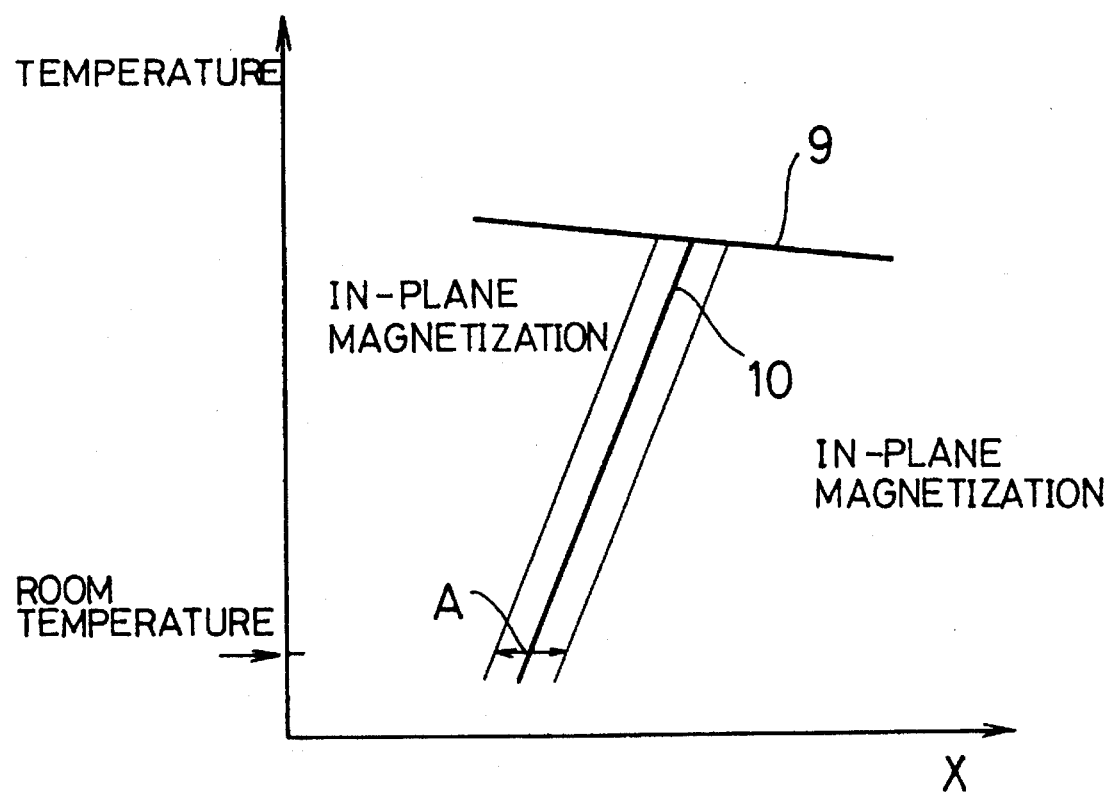

For example, as shown in FIG. 2, the magnetic state of $Gd_x(FeCo)_{1-x}$ varies with the temperature and the composition of Gd. Border line 9 represents the Curie temperature and border line 10 represents the compensation temperature. Therefore, magnetization is exerted within the temperature zone lower than border 9. Perpendicular magnetization appears only within the very narrow range A in the proximity of border line 10, while in-plane magnetization appears in the other ranges. This is because perpendicular magnetization occurs only in the vicinity of the compensating temperature where the magnetic moment of the rare-earth metal Gd and that of the transition metal FeCo balance each other.

The magnetic moments of the rare-earth metal and the transition metal are respectively different from each other in their temperature characteristics. At high temperatures, the magnetic moment of the transition metal becomes greater than the magnetic moment of the rare-earth metal. Therefore, it is arranged that the content of the rare-earth metal is set to be greater in comparison with the compensating composition at room temperature, and such an alloy then exhibits in-plane magnetization at room temperature while exhibiting perpendicular magnetization upon undergoing a temperature rise.

In the present embodiment, x (Gd content) is set in such a manner that the compensating composition can be achieved at around 70° C., that is, the compensation temperature is around 70° C.

The recording layer 4 is a thin film of a rare-earth-transition-metal alloy, DyFeCo. Its film thickness is 20 nm and its Curie temperature is set to be within 150° C. to 250° C.

The transparent dielectric film 5 (FIG. 1), which functions as a protective film, is a nitride film of AlN, SiN, AlSi, etc., and its film thickness is 50 nm.

The magneto-optical disk of the present embodiment is further provided with recorded bits that are preliminarily formed on the tracks of 10–100 located at the outermost area or the innermost area thereof.

Here, the tracks refer to the recording layer 4 on the groove or the recording layer 4 on the land between the grooves. Therefore, as with the layout of the groove, the layout of the tracks shows a spiral shape.

The above-mentioned recorded bits are formed so that a reproduced signal having a single frequency can be obtained. That is, magnetic domains having an upward magnetization and magnetic domains having a downward magnetization are alternately aligned and the lengths of these magnetic domains are set to be virtually the same. Moreover, the length of these magnetic domains are set to become the shortest in the modulation method that is adopted.

In the present embodiment, the setting of the intensity of the light beam 7 is carried out according to the recorded bits during reproduction, which will be described later. For this reason, the recorded bits are hereinafter referred to as "setting bits" so as to make them different from ordinary recorded bits for use in recording and reproduction of information.

The following description will discuss a principle of reproducing the above-mentioned magneto-optical disk.

During reproduction, the light beam 7, which has been converged by a converging lens 8, is projected onto the readout layer 3 from the substrate 1 side to form a light spot thereon.

Figure 3:
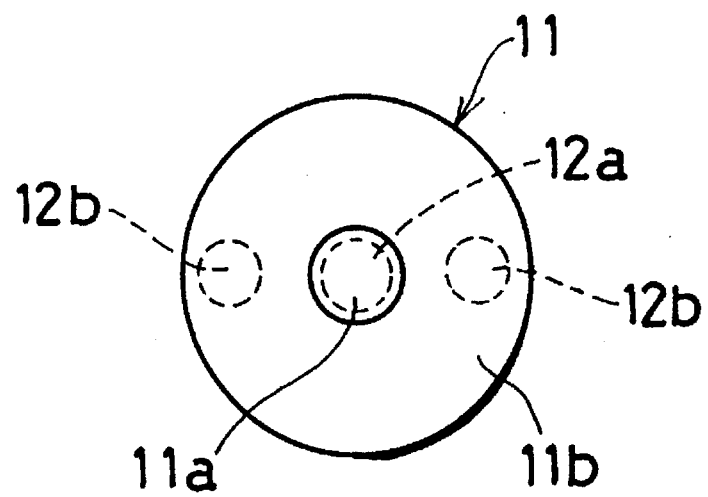
Figure 4:
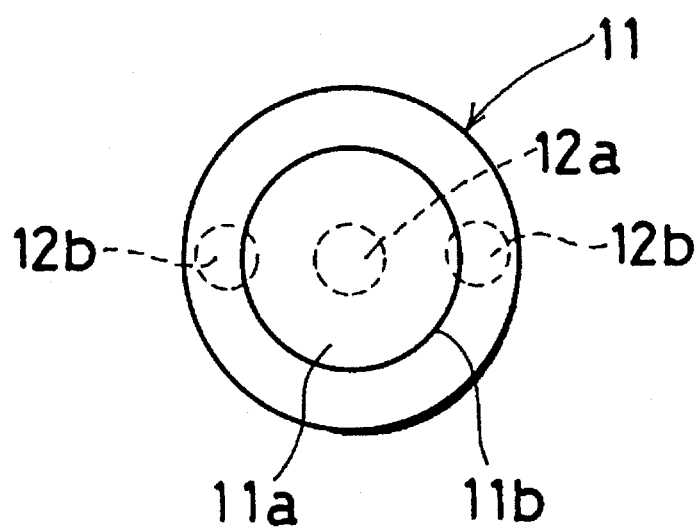
Figure 5:
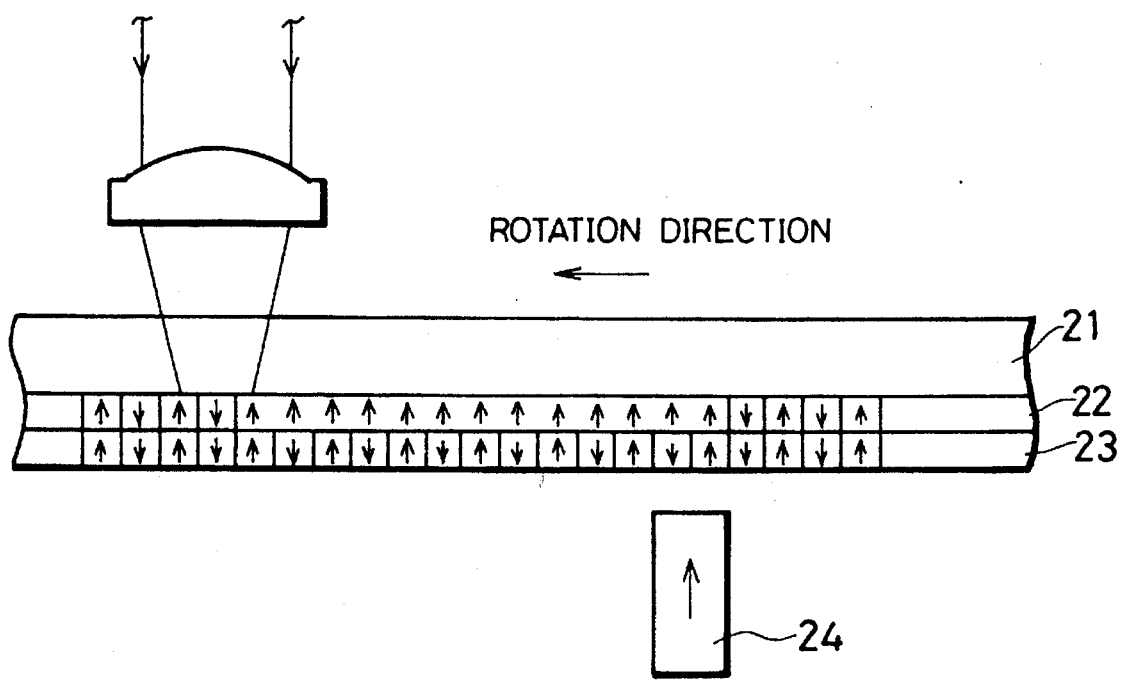
FIG. 5, which shows the prior art, is an explanatory drawing in conjunction with reproduction of the magneto-optical disk.

Here, the light beam 7 is converged to a diffraction limit by the converging lens 8 such that the light intensity distribution shows a Gaussian distribution. Therefore, as shown in FIG. 3, the temperature distribution of region 11 on the readout layer 3 undergoing the irradiation of the light beam 7 also exhibits a virtual Gaussian distribution. In other words, the temperature of region 11 is the highest at region 11a in the center, and gradually decreases toward region 11b on the periphery.

In the present embodiment, the intensity of the light beam 7 is determined so that the temperature of region 11a becomes 70° C. or more while the temperature of region 11b is kept below 70° C. For this reason, a transition from in-plane magnetization to perpendicular magnetization occurs in region 11a, whereas in-plane magnetization is maintained in region 11b.

The perpendicular magnetization of region 11a becomes coincident with the magnetization direction of recorded bit 12a of the recording layer 4 due to an exchange coupling force exerted between the readout layer 3 and the recording layer 4 (see FIG. 1). In other words, the direction of the magnetization of recorded bit 12a is transferred onto region 11a of the readout layer 3. Thus, information is reproduced by using a reflected light derived from the light beam 7.

On the other hand, the in-plane magnetization of region 11b masks recorded bits 12b adjoining to recorded bit 12a. For this reason, recorded bit 12b exhibits no magneto-optical effect in response to the light beam 7.

With this arrangement, recorded bit 12a whose diameter is smaller than the diameter of the light spot of the light beam 7 (equal to the size of region 11) can be reproduced. Further, the reproduced signal is virtually free from interference by adjacent recorded bit 12b, thereby achieving noise reduction. Moreover, no application of auxiliary magnetic field is required.

The following description will discuss a setting method of the intensity of the light beam 7 during reproduction.

First, the light beam 7 is projected onto tracks whereon the above-mentioned setting bits (recorded bits having a single frequency) are formed, and the setting bits are reproduced. At this time, the intensity of the light beam 7 is set to be lower than that expected to be an optimal intensity.

Next, the reproduction is conducted with a slightly stronger intensity of the light beam 7. In this case, if the amplitude of the reproduced signal is greater than that which has been seen before, the reproduction is further conducted with an increased intensity of the light beam 7.

Thereafter, this operation is repeatedly conducted until the amplitude of the reproduced signal becomes smaller than that which has been seen before, and at this point the repeated operation is completed. Thus, the intensity of the light beam 7 is set so that the amplitude of the reproduced signal becomes maximum.

In the case where the above-mentioned setting of the intensity of the light beam 7 is not conducted, if the intensity of the light beam 7 is too strong, region 11a having a temperature rise of above 70° C. becomes larger; therefore, not only recorded bit 12a, but also adjacent recorded bits 12b are reproduced. This results in a smaller amplitude of the reproduced signal.

Conversely, if the intensity of the light beam 7 is too weak, region 11a having a temperature rise of above 70° C. becomes smaller; this also results in a smaller amplitude of the reproduced signal derived from region 12a. If there is no region 11a having a temperature rise of above 70° C., no reproduced signal is obtained.

In the magneto-optical disk of the present embodiment, since the intensity of the light beam 7 is set to be an optimal value, a maximum amplitude of the reproduced signal can be obtained. With this arrangement, a high-quality reproduced signal can be always obtained independent of variation in quality resulted from the manufacturing process of the magneto-optical disk, changes with age of the various characteristics of the magneto-optical disk, changes with age of the intensity of the light beam 7, changes of ambient temperature in the application of the magneto-optical recording-reproduction apparatus, or other changes. On top of that, no auxiliary magnetic field is required for reproduction.

In the above embodiment, the setting bits are formed on the tracks of 10–100; yet, the setting bits may be formed on any number of tracks as long as the setting bits can be read out without requiring any accurate positional information and they can be read even if there are errors such as a relative positional error in the installation of the optical head (not shown) and the magneto-optical disk.

Moreover, the tracks whereon the setting bits are formed may be located in the proximity of the starting position of the recording or reproduction of the magneto-optical disk, for example, on the outermost area or the innermost area of the magneto-optical disk, as has been shown in the above embodiment. This arrangement is more advantageous in setting the intensity of the light beam 7.

Furthermore, it is desirable to set the length of each setting bit (the length of each magnetic domain) to become the shortest in the modulation method that is adopted, as has been described above. Thus, the intensity of the light beam 7 is set in such a manner that a reproduced signal of the highest quality can be obtained.

Additionally, in the above embodiment, a circuit for detecting the amplitude of the reproduced signal from the setting bits is constituted, for example, by a band-pass filter capable of passing only the reproduced signal (having a single frequency) of the setting bits, a detecting circuit for detecting a signal extracted by the band-pass filter, and an integration circuit for integrating the detected signal; thus, the amplitude of the reproduced signal can be converted into voltage and consequently detected.

In addition, in the setting method of the intensity of the light beam 7, the intensity of the light beam 7 is gradually increased; yet, conversely, the intensity of the light beam 7 may be set to be higher than that expected to be an optimal intensity, and gradually decreased. With this arrangement, a reproduced signal can be always obtained upon starting the setting operation.

The following description will discuss the second embodiment of the present invention.

The magneto-optical disk of the present embodiment is different from that of the first embodiment in that sector formats composed of magnetic domains having an upward magnetization and a downward magnetization are preliminarily formed instead of forming the setting bits.

In one of the applications of the magneto-optical disk wherein the disk is divided into a plurality of sectors, the sector format is provided to the leading section of each sector. The sector format contains address information such as a track number and a sector number.

The sector format of the present invention is based on a sector format of the optical disk that is defined by the ISO standard. Therefore, a VFO signal is recorded after a sector mark (a mark representing the start of a sector). Here, the VFO signal refers to a signal that is required to generate a data clock (reference phase signal) required for demodulation. The recording frequency of the VFO signal is set to be virtually the same as the recording frequency of the shortest recorded bit in a modulation method such as the 2–7 modulation method.

Next, an explanation will be given of a setting method of the intensity of a light beam during reproduction.

In the present embodiment, by reproducing the VFO signal, the intensity of a light beam is determined by making the amplitude of the reproduced VFO signal maximum. The optimal value of the intensity of the light beam is found through the same method as the aforementioned embodiment. With this arrangement, the shortest recorded bits can be reproduced in good signal quality during reproduction of the information. Further, since no setting bit is required, free areas (information recording areas) are not reduced.

The setting method of the intensity of the light beam of this embodiment is especially effective where address management of information is required in such a device as an external memory of computers, that is, in the case where the sector format is required.

The following description will discuss the third embodiment of the present invention.

The magneto-optical disk of the present invention is the same as that of the above-mentioned embodiment; yet, the setting method of the intensity of a light beam during reproduction is different therefrom.

In the setting method of the intensity of the light beam of the present invention during reproduction, VFO signals and sector marks of the sector formats preliminarily formed on the magneto-optical disk are reproduced, and the intensity of the light beam is then determined by setting the ratio of the amplitudes of these reproduced signals at a predetermined value.

The recorded bit of the sector mark is greatly longer than that of the VFO signal, and is substantially longer than the diameter of a light spot. For this reason, even if the size of a high-temperature region within the light spot fluctuates slightly due to a change in the intensity of the light beam, a resulting change in amplitude of the reproduced signal of the sector mark is comparatively smaller than that of the VFO signal.

By utilizing such a less-fluctuating amplitude of the reproduced signal of the sector mark as a reference, a ratio is found in relation to the amplitude of the reproduced signal of the VFO signal, and the intensity of the light beam is determined by setting the ratio at the predetermined value; thus, an optimal intensity of the light beam can be found in a short time.

In other words, in the first embodiment as well as in the second embodiment, the intensity of the light beam needs to be changed until the amplitude of the reproduced signal of the setting bit or the amplitude of the reproduced signal of the VFO signal becomes maximum. On the other hand, in the method of the present embodiment, the changing operation of the intensity of the light beam can be completed as soon as the above-mentioned ratio has reached the predetermined value. With this arrangement, an optimal intensity of the light beam can be found in a short time, and the circuit for setting the intensity of the light beam can be simplified.

The setting methods of the intensity of the light beam described in the first through third embodiments are intended to provide methods for adjusting the local high-temperature area so as to have an optimal size by controlling the intensity of the light beam to be projected onto the readout layer 3 (FIG. 1) during reproduction. Therefore, these methods are widely applied to magneto-optical disks wherein recorded bits whose size is smaller than the diameter of the light spot are reproduced by utilizing a local temperature rise within a region smaller than the diameter of the light spot during reproduction of the information.

For example, these setting methods of the intensity of the light beam can be applied to magneto-optical disks wherein a reflective layer is formed between the transparent dielectric film 5 and the overcoat film 6 of FIG. 1 in such a manner that the magneto-optical effect is enhanced, that is, the magnetic Kerr rotation angle is increased.

Further, these setting methods can be applied to magneto-optical disks which are provided with an auxiliary magnetic layer for enabling overwriting operation in light modulation method, a switching layer, an initialization-use magnetic layer, etc., in addition to the readout layer 3 and the recording layer 4. Moreover, these setting methods are applicable to magneto-optical disks wherein the readout layer also functions as the recording layer.

On top of that, the setting methods of the intensity of the light beam are applicable to magneto-optical disks which are provided with a readout layer having a different magnetic characteristic from the readout layer 3 that has been described in the above embodiments.

The magneto-optical disk of this type is constituted of a substrate as well as a readout layer and a recording layer formed on the substrate. The recording layer has a great coercive force at room temperature. On the contrary, the readout layer has a small coercive force at room temperature. When the temperature of an area of the readout layer to be reproduced is raised, the direction of the magnetization thereon becomes coincident with the direction of the magnetization of the recording layer due to the effect of the recording layer. That is, the magnetization of the recording layer is copied onto the readout layer by an exchange coupling force between the readout layer and the recording layer.

In the above arrangement, when the recorded bits are to be reproduced, it is necessary to initialize the direction of magnetization of the readout layer so as to make it coincident with the predetermined direction (for example, upward) by applying an auxiliary magnetic field from an auxiliary magnetic field generating device. Then, by projecting a reproduction-use light beam thereonto, the temperature of the recording layer is locally raised and the magnetized information is copied onto the readout layer. Thus, the temperature of a central portion of the area which has received the reproduction-use light beam is raised, and only the information located in the central portion is reproduced. Accordingly, recorded bits whose size is smaller than the size of the light beam spot are permitted to be read out.

In the magneto-optical disks of this type, by adopting the above-mentioned setting methods of the intensity of the light beam during reproduction, a high-quality reproduced signal can be obtained.

In the above embodiments, explanations have been given on the magneto-optical disks as examples; yet, the present invention is applicable to magneto-optical tapes or magneto-optical cards.

Additionally, the groove is not necessarily formed in the shape of spiral, but may be formed, for example, in the shape of concentric circles. Further, if pre-pits (pits which are preliminarily formed as protrusions and recessions) are provided, no groove is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical disk comprising:

a disc-shaped substrate; and a recording layer formed on the substrate, the recording layer having a preset bit area whereon at least one setting bit is recorded as information for setting the intensity of a light beam used in reproduction is preliminarily recorded, said information being recorded as recording bits each having a diameter smaller than a diameter of a light spot on said magneto-optical disk that is derived from said light beam used in reproduction.

2. The magneto-optical disk as defined in claim 1, wherein recording bits, each having a diameter smaller than the diameter of the reproduction-use light beam on the magneto-optical disk, are formed on the recording layer.

3. The magneto-optical disk as defined in claim 2, further comprising:

a read-out layer for reading out information recorded on the recording layer.

4. The magneto-optical disk as defined in claim 3, wherein the recording layer is made of a magnetic film having a perpendicular magnetization with respect to the substrate and the readout layer is made of a magnetic film which exhibits a transition from in-plane magnetization to perpendicular magnetization upon being subjected to a temperature rise.

5. The magneto-optical disk as defined in claim 2, wherein the preset bit area is formed on the innermost portion or on the outermost portion of the magneto-optical disk.

6. The magneto-optical disk as defined in claim 2, wherein the preset bit area is formed along at least one complete track on the magneto-optical disk.

7. The magneto-optical disk as defined in claim 2, wherein the recording layer is made of a magnetic film having a perpendicular magnetization with respect to the substrate, and the preset bit area has a construction wherein magnetic domains having an upward magnetization and magnetic domains having a downward magnetization are alternatively disposed with each magnetic domain having a virtually identical length.

8. The magneto-optical disk as defined in claim 7, wherein the magnetic domains disposed on the preset bit area have the shortest length among the magnetic domains formed on the recording layer.

9. The magneto-optical disk of claim 1 wherein said at least one setting bit is distinguishable as having a recording mark magnetic domain that is shorter than other recording mark magnetic domains used on the magneto-optical disk.

10. The magneto-optical disk of claim 4 wherein said transition occurs even under an external magnetic field of zero.

* * * * *